(12) United States Patent
Isomura et al.

(10) Patent No.: US 7,277,608 B2
(45) Date of Patent: Oct. 2, 2007

(54) OPTICAL TRANSMITTER

(75) Inventors: Akihiko Isomura, Kawasaki (JP); Jens Rasmussen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/340,530

(22) Filed: Jan. 27, 2006

(65) Prior Publication Data
US 2007/0014513 A1    Jan. 18, 2007

(30) Foreign Application Priority Data
Jul. 15, 2005    (JP)    ............................. 2005-207465

(51) Int. Cl.
*G02B 6/28*    (2006.01)
(52) U.S. Cl. ...................................... 385/24
(58) Field of Classification Search ................ None
See application file for complete search history.

(56) References Cited

U.S. PATENT DOCUMENTS

| 5,519,796 | A | 5/1996 | Li et al. ......................... 385/24 |
| 5,673,342 | A * | 9/1997 | Nelson et al. ................. 385/24 |
| 5,675,432 | A | 10/1997 | Kosaka ........................ 359/341 |
| 6,549,699 | B2 | 4/2003 | Belser et al. |
| 6,678,473 | B1 * | 1/2004 | Morthier ....................... 398/56 |
| 2003/0002104 | A1 | 1/2003 | Caroli et al. |
| 2003/0035170 | A1 | 2/2003 | DeGrange |
| 2004/0165807 | A1 * | 8/2004 | Liu ................................ 385/3 |

FOREIGN PATENT DOCUMENTS

| EP | 0 818 894 | 1/1998 |
| JP | 2000-206362 | 7/2000 |
| JP | 2003-69499 | 3/2003 |

OTHER PUBLICATIONS

J. Tsai, et al., "A Large Port-Count 1×32 Wavelength-Selective Switch Using a Large Scan-Angle, High Fill-Factor, Two-Axis Analog Micromirror Array," OECC, 2004, Tul. 5.2.
D. Marom, et al., "Wavelength Selective 4×1 Switch with High Spectral Efficiency, 10Db Dynamic Equalization Range and Internal Blocking Capability," OECC, 2003, We4., p. 130.
D. Marom, et al., "64 Channel 4×4 Wavelength-Selective Cross-Connect for 40Gb/s Channel Rates with 10 Tb/s Throughput Capacity," OECC, 2003, Mo. 3.5.3.
Office Communication dated Oct. 23, 2006 containing the European Search Report from corresponding European Patent Application No. 06001521.1.

* cited by examiner

*Primary Examiner*—Michelle Connelly-Cushwa
*Assistant Examiner*—Chris H. Chu
(74) *Attorney, Agent, or Firm*—Bingham McCutchen LLP

(57) ABSTRACT

A wavelength-division multiplexing transmitter that is capable of enhancing its ability to compensate for a difference in light intensity between wavelengths. The wavelength-division multiplexing transmitter includes an optical branching part for branching a wavelength-division multiplexed input optical signal into a plurality of optical signals, a plurality of wavelength-selective devices for selecting as output wavelengths the wavelengths of each of the optical signals branched by the optical branching part, and an optical coupling part for coupling the output wavelengths respectively output from the plurality of wavelength-selective devices. At least either the branching in the optical branching part or the coupling in the optical coupling part is performed at a power ratio M:N where M and N differ from each other.

11 Claims, 11 Drawing Sheets

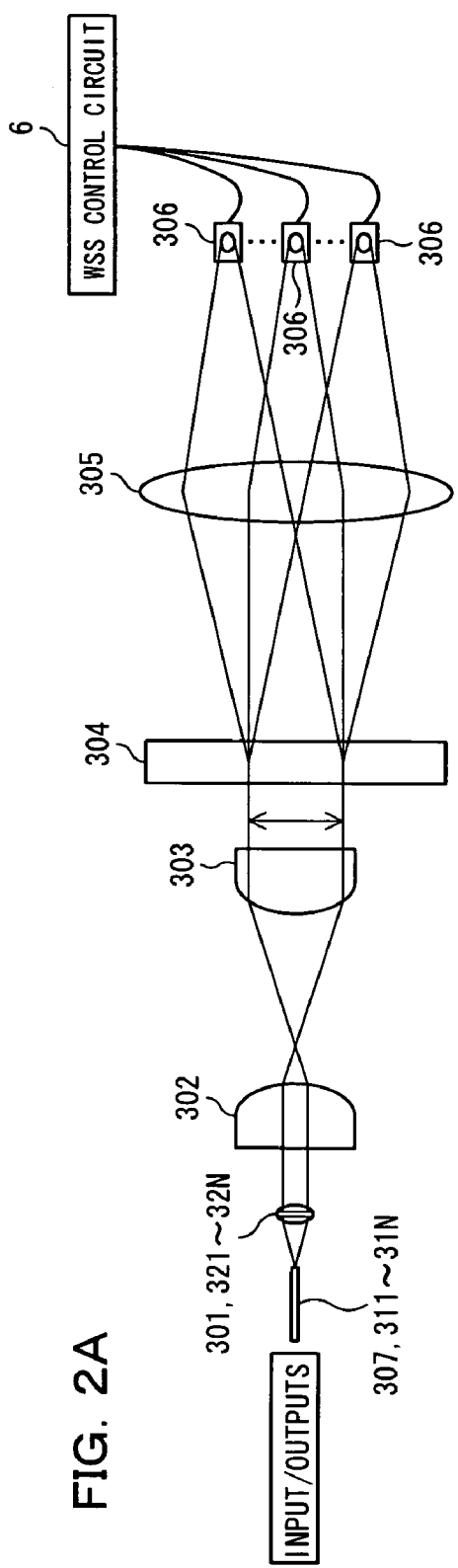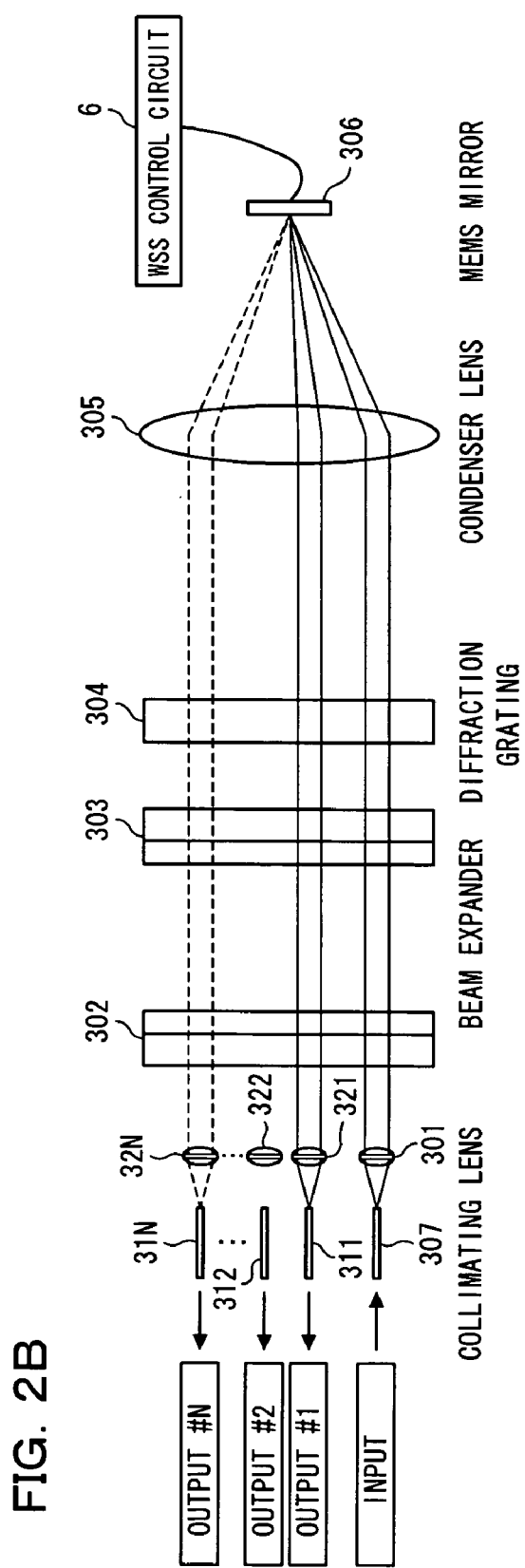

OPTICAL TRANSMITTER

BACKGROUND OF THE INVENTION

1) Field of the Invention

The present invention relates to an optical transmitter particularly suitable for wavelength-division multiplexing (WDM) transmission systems.

2) Description of the Related Art

With an increase in the use of the Internet, WDM transmission systems using WDM transmitters have been improved. The WDM transmission systems are being recently requested to have the function of setting transmission lines in wavelength units. Because of this, the application of wavelength-selective switches to the WDM transmitter is being studied so that line settings can be readily switched in wavelength units.

FIGS. 8A and 8B both illustrate the function of a wavelength-selective switch. The wavelength-selective switch 100A shown in FIG. 8A is a device capable of outputting the wavelengths of a wavelength-division multiplexed signal through its arbitrary ports. That is, the wavelength-selective switch 100A includes a single input port 101 and nine output ports 111 to 119, and if a wavelength-division multiplexed signal is input through the input port 101, the switch 100A can output arbitrary wavelengths through arbitrary ports of the output ports 111 to 119. For example, if a signal with multiplexed wavelengths $\lambda 1$ to $\lambda 5$ is input through the input port 101, the wavelengths $\lambda 2$, $\lambda 1$, $\lambda 5$, $\lambda 3$, and $\lambda 4$ can be output through the output ports 111, 113, 114, 116, and 118.

In addition, as shown in FIG. 8B, a wavelength-selective switch 100B may be constructed so that it becomes the reverse of the wavelength-selective switch 100A shown in FIG. 8A. In this case, the wavelength-selective switch 100B includes nine input ports 121 to 129 and a single output port 131, and if arbitrary wavelengths $\lambda 1$ to $\lambda 5$ are input through arbitrary ports of the input ports 121 to 129, a wavelength-division multiplexed signal can be output through the output port 131.

In addition to the function of switching ports, the wavelength-selective switch has the function of variably attenuating light intensity. Therefore, the wavelength-selective switch is able to compensate for a difference in light intensity between wavelengths by using the variable attenuator function. Note that examples of wavelength-selective switches are disclosed in patent document 1 (U.S. Pat. No. 6,549,699) and non-patent documents 1 (Jui-che Tsai et al., "A Large Port-Count 1×32 Wavelength-Selectable Switch Using a Large Scan-Angle, High Fill-Factor, Two-Axis Analog Micromirror Array" OECC 2004, Tul.5.2) and 2 (D. M. Marom et al., "Wavelength-selectable 4×1 switch with high spectral efficiency, 10 dB dynamic equalization range and internal blocking capability" OECC 2003, We4.P.130).

FIGS. 9 to 11 illustrate WDM transmitters 200, 210, and 220 employing wavelength-selective switches such as those shown in FIGS. 8A and 8B, respectively. These WDM transmitters 200, 210, and 220 are dynamic optical add-drop multiplexers (DOADMs) constructed in a way that arbitrary wavelengths can be input or output through their arbitrary ports. Similar dynamic optical add-drop multiplexers are disclosed in non-patent document 3 (D. M. Marom et al., "64 Channel 4×4 Wavelength-Selectable Cross-Connect for 40 Gb/s Channel Rates with 10 Tb/s Throughput Capacity" OECC 2003).

The WDM transmitter 200 shown in FIG. 9 is constructed so that the wavelength-selective switches 201, 202 are disposed opposite each other. The first wavelength-selective switch 201 is a 1×N wavelength-selective switch (where N≧2), which consists a single input port and N output ports. The second wavelength-selective switch 202 is an N×1 wavelength-selective switch (where N≧2), which consists N input ports and a single output port.

One of the N output ports of the first wavelength-selective switch 201 is connected to one of the N input ports of the second wavelength-selective switch 202. The remaining output ports of the first wavelength-selective switch 201 are used as drop ports, whereas the remaining input ports of the second wavelength-selective switch 202 are used as add ports.

In this arrangement, among the wavelengths of a wavelength-division multiplexed signal input to the input port of the first wavelength-selective switch 201, wavelengths that should be passed through the WDM transmitter 200 are output from the output port of the second wavelength-selective switch 202 through a transmission line leading to the second wavelength-selective switch 202. On the other hand, wavelengths to be branched are output through arbitrarily selected drop ports, and wavelengths to be added are input through the add ports of the second wavelength-selective switch 202 and are output from the output port of the second wavelength-selective switch 202.

The monitor 203 is used to monitor the optical power of each of the wavelengths of the optical signal output from the second wavelength-selective switch 202. The control circuit 204 equalizes the optical powers of the wavelengths of the optical signal output from the second wavelength-selective switch 202, by controlling the variable attenuator function of each of the wavelength-selective switches 201 and 202, based on the optical powers of the wavelengths monitored by the monitor 203.

The WDM transmitter 210 shown in FIG. 10 includes an optical combiner 211, a first wavelength-selective switch 212, a second wavelength-selective switch 213, a monitor 214, and a control circuit 215. The optical combiner 211 branches an input signal light into two and outputs them to the input ports of the wavelength-selective switches 212, 213, respectively.

The first wavelength-selective switch 212 consists of a single input port and N output ports. One of the two signals branched in the optical combiner 211 is input to the input port of the first wavelength-selective switch 212, and wavelengths to be dropped are output through the output ports arbitrarily selected as drop ports.

The second wavelength-selective switch 213 consists of N input ports and a single output port. The other of the two signals branched in the optical combiner 211 is input to one of the N input ports of the second wavelength-selective switch 213, and wavelengths to be added are input through the input ports arbitrarily selected as add ports. And a wavelength-division multiplexed signal is output through one of the output ports. Note that in the case where wavelengths have been added through other input ports of the second wavelength-selective switch 213, those wavelengths of the branched signal from the optical combiner 211 can be blocked so that those wavelengths are not output from the output port of the second wavelength-selective switch 213.

The monitor 214 is used to monitor theoptical power of each of the wavelengths of the optical signal output from the second wavelength-selective switch 213. The control circuit 215 equalizes the optical powers of the wavelengths of the optical signal output from the second wavelength-selective switch 213, by controlling the variable attenuator function of the wavelength-selective switch 213, based on the optical power of each of the wavelengths monitored by the monitor 214.

The WDM transmitter 220 shown in FIG. 11 includes a first wavelength-selective switch 221, a second wavelength-selective switch 222, an optical combiner 223, a monitor 224, and a control circuit 225. Unlike the case of the WDM transmitter 210 shown in FIG. 10, the optical combiner 222 is disposed after the wavelength-selective switches 221, 222.

That is, the first wavelength-selective switch 221, as with the wavelength-selective switches 201, 212 in FIGS. 9 and 10, includes a single input port and N output ports. Among the wavelengths of a wavelength-division multiplexed signal input to the input port, wavelengths to be passed through are output to the optical combiner 223 through the single output port, while wavelengths to be dropped are output through some of the output ports selected as drop ports. The second wavelength-selective switch 222, as with the wavelength-selective switches 202, 213 in FIGS. 9 and 10, has N input ports and a single output port. Wavelengths to be added are input through some of the input ports selected as add ports and are output to the optical combiner 223 through the single output port.

In the optical combiner 223, the wavelengths from the first wavelength-selective switch 221 and the wavelengths from second wavelength-selective switch 222 can be combined and output. The monitor 224 monitors the optical power of each of the wavelengths of the optical signal output from the optical combiner 223. The control circuit 225 equalizes the optical powers of the wavelengths of the optical signal output from the optical combiner 223, by controlling the variable attenuator function of each of the wavelength-selective switches 221 and 222, based on the optical power of each of the wavelengths monitored by the monitor 224.

Like the WDM transmitters 200, 210, and 220 shown in FIGS. 9 to 11, by employing dynamic optical add-drop multiplexers in which drop and add ports for a wavelength-division multiplexed signal can be arbitrarily selected independently of wavelengths, a WDM transmission system capable of flexibly setting transmission lines in wavelength units can be constructed.

On the other hand, optical transmission lines forming part of the aforementioned WDM transmission system become longer with development of communication networks, so that WDM transmitters are being requested to be constructed so that long-distance transmission can be performed. What matters is that in performing long-distance transmission of a wavelength-division multiplexed signal, losses in optical fibers and amplifier's gain vary from wavelength to wavelength. Such a difference in transmission loss or amplifier's gain between wavelengths can be the cause of a difference in light intensity between wavelengths at a receiving side.

The WDM transmitters 200, 210, and 220 shown in FIGS. 9 to 11 are attempting to compensate for such a difference in intensity between wavelengths by employing the variable attenuator function equipped, along with the port switching function, in the aforementioned wavelength-selective switch.

For instance, as shown in FIG. 12, in an optical transmission system 230, in which in-line amplifiers 234, 235 are disposed in a transmission fiber 233 between two nodes 231, 232 having the construction of the WDM transmitter 210 shown in FIG. 10, a wavelength-division multiplexed signal output from the node 231 (see "A" in FIG. 12) varies in light intensity from wavelength to wavelength due to the amplification characteristics of the in-line amplifiers 234, 235 (see "B" and "C" in FIG. 12), but the light intensities at different wavelengths are equalized by attenuating the wavelengths of the output optical signal, using the variable attenuator function of a wavelength-selective switch 213 provided in the node 232 (see "D" in FIG. 12).

However, as transmission distance is increased, a difference in intensity between wavelengths becomes greater due to the influence of transmission lines between WDM transmitters. As a result, there are cases where a great difference in intensity exceeding a dynamic range which can be corrected by the variable attenuator function of the aforementioned wavelength-selective switch must be corrected.

The WDM transmitters shown in FIGS. 9 to 11 are attempting to compensate for a difference in intensity by using the variable attenuator function of the aforementioned wavelength-selective switch. Therefore, in the case where a great difference in intensity exceeding a dynamic range which can compensate for a difference in intensity occurs within nodes, a compensation for this difference cannot be made sufficiently. Consequently, making transmission distance longer becomes fairly difficult.

For instance, as shown in "E" of FIG. 13, when an input optical signal has a great difference in intensity, there are cases where there is a range A which cannot compensate for a difference in intensity by the variable attenuator function of the wavelength-selective switch 213, as shown in "F" of FIG. 13.

SUMMARY OF THE INVENTION

The present invention has been made in view of the circumstances mentioned above. Accordingly, it is the object of the present invention to provide an optical transmitter that is capable of enhancing its ability to compensate for a difference in light intensity between wavelengths.

To achieve this end, an optical transmitter of the present invention comprises three major components: (1) an optical branching part for branching a wavelength-division multiplexed input optical signal into a plurality of optical signals; (2) a plurality of wavelength-selective devices for selecting as output wavelengths the wavelengths of each of the optical signals branched by the optical branching part; and (3) an optical coupling part for coupling the output wavelengths respectively output from the plurality of wavelength-selective devices. At least either the branching in the optical branching part or the coupling in the optical coupling part is performed at a power ratio M:N where M and N differ from each other.

The optical transmitter of the present invention may further comprise (1) a power monitor for monitoring an optical power at each of the wavelengths of an optical signal output from the optical coupling part; and (2) a wavelength-selective device control part for controlling each of the wavelength-selective devices so that the output wavelengths to the optical coupling part are selected in each of the wavelength-selective devices, based on the optical power monitored at each of the wavelengths of the output optical signal by the power monitor.

In the optical transmitter of the present invention, the aforementioned wavelength-selective devices are preferably constructed so that they can select the output wavelengths and vary an optical power of each of the output wavelengths. The aforementioned wavelength-selective device control part preferably performs the variable control of the optical power and control of the wavelength selection of the plurality of wavelength-selective devices so that the optical powers at the wavelengths of the optical signal output from the optical coupling part are equalized, based on the optical powers monitored by the power monitor.

In the optical transmitter of the present invention, at least either the optical branching part or the optical coupling part may comprise a variable ratio combiner. And at least either a branching ratio in the optical branching part or a coupling ratio in the optical coupling part may be made variable by the variable ratio combiner. In this case, the optical transmitter may further comprise (1) a power monitor for monitoring an optical power at each of the wavelengths of an optical signal output from the optical coupling part; and (2) a variable ratio combiner control part for controlling the variable ratio combiner to set the branching ratio or coupling ratio of the variable ratio combiner, based on the optical power monitored at each of the wavelengths of the output optical signal by the power monitor.

Preferably, the aforementioned wavelength-selective device control part controls each of the wavelength-selective devices so that as an optical power monitored at a wavelength of the optical output signal by the power monitor becomes greater, the wavelength is selected in the wavelength-selective device provided in a line that is connected to a side where one branched power in the optical branching part or one combined power in the optical coupling part becomes smaller than the other branched or combined powers.

In the optical transmitter of the present invention, the aforementioned wavelength-selective device control part may control each of the wavelength-selective devices so that the output wavelengths selected in the wavelength-selective devices do not overlap each other.

In the optical transmitter of the present invention, the aforementioned optical branching part may be constructed so that the input optical signal is branched into two parts. In this case, the aforementioned wavelength-selective devices may comprise two wavelength-selective devices so that they correspond to the number of branched parts. And the aforementioned optical coupling part may be constructed to combine two optical signals respectively output from the two wavelength-selective devices.

One of the aforementioned two wavelength-selective devices may comprise a first wavelength-selective switch having a single input and a plurality of outputs, while the other may comprise a second wavelength-selective switch having a plurality of inputs and a single output. In this case, the single input of the first wavelength-selective switch can be connected to one of two branch outputs of the optical branching part. One of the outputs of the first wavelength-selective switch can be connected to one of two inputs of the optical coupling part. The remaining outputs of the first wavelength-selective switch can be used as drop outputs. And one of the inputs of the second wavelength-selective switch can be connected to the other of the two branch outputs of the optical branching part. The remaining inputs of the second wavelength-selective switch can be used as add inputs. The single output of the second wavelength-selective switch can be connected to the other of the two inputs of the optical coupling part.

Thus, according to the present invention, at least either the branching in the optical branching part or the coupling in the optical coupling part is performed at a power ratio M:N where M and N differ from each other. Therefore, the present invention has the advantages of being able to enlarge a range that can compensate for a difference in intensity between wavelengths and of being able to enhance its ability to compensate for such a difference.

BRIEF DESCRIPTION OF THE DRAWINGS

The present invention will be described in further detail with reference to the accompanying drawings wherein:

FIG. 2A is a side view schematically showing a wavelength-selective switch employed in the WDM transmitter of the first embodiment of the present invention;

FIG. 2B is a plan view schematically showing the wavelength-selective switch of FIG. 2A;

DESCRIPTION OF THE PREFERRED EMBODIMENTS

Preferred embodiments of the present invention will hereinafter be described in detail with reference to the drawings. Note that the foregoing and other objects, features, and advantages of the present invention will become apparent from the following detailed description.

(A) Description of First Embodiment

Figure 1:
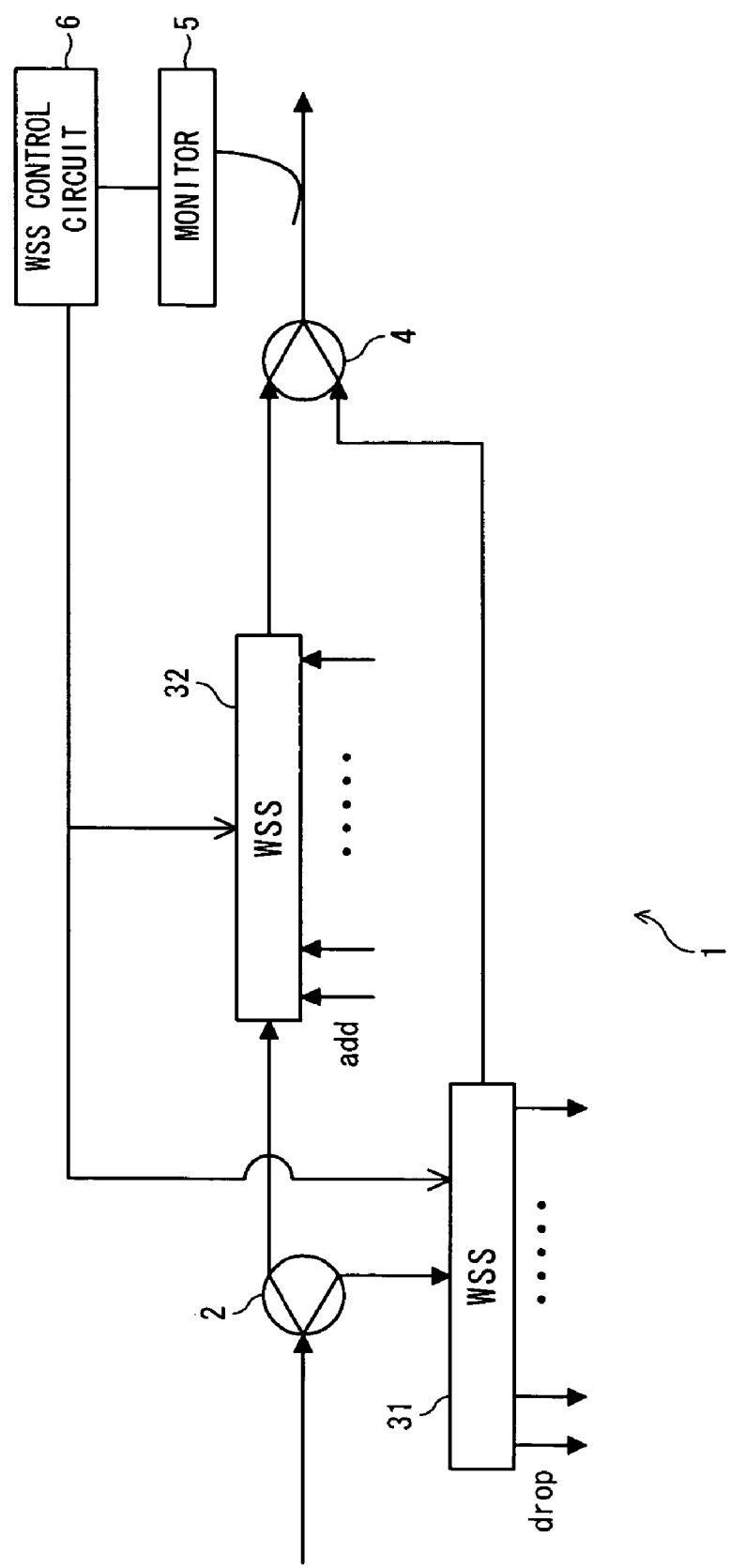
FIG. 1 is a block diagram showing a WDM transmitter constructed in accordance with a first embodiment of the present invention.
Figure 9:
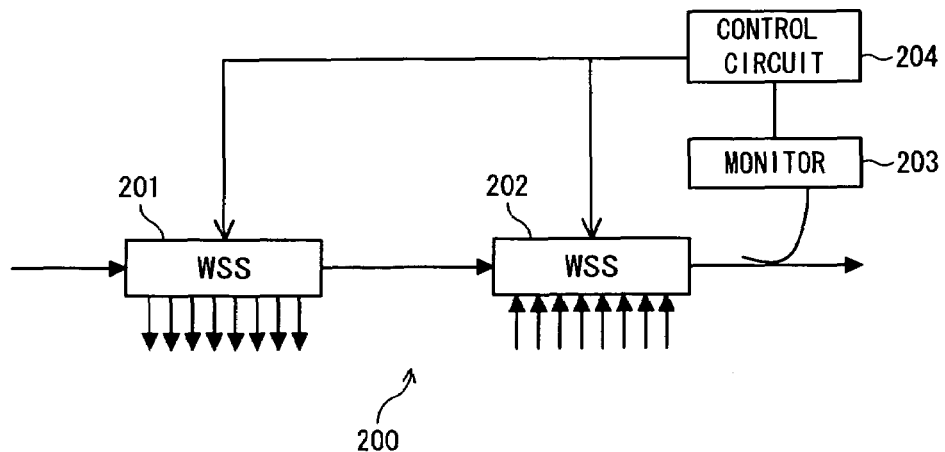
FIGS. 9 to 11 are block diagrams used to explain a conventional WDM transmitter employing wavelength-selective switches.

Referring to FIG. 1, there is shown an optical transmitter, or a WDM transmitter 1 constructed in accordance with a first embodiment of the present invention. The WDM transmitter 1 shown in the figure, as with the cases of FIGS. 9 to 11 previously mentioned, can be employed as a dynamic optical add-drop multiplexer in WDM transmission systems, and as set forth below in detail, it can enhance its ability to compensate for a difference in light intensity between wavelengths.

The WDM transmitter 1 includes an input optical combiner 2, a first wavelength-selective switch 31, a second wavelength-selective switch 32, an output optical combiner 4, a monitor 5, and a control circuit 6 for controlling the wavelength-selective switches 31, 32. The input optical combiner 2 is constructed so that an input optical signal is branched into a plurality of optical signals. In the first embodiment, an input optical signal is branched into two optical signals at a fixed power ratio M:N where M and N differ from each other.

More specifically, in the first embodiment, the input optical combiner 2 is constructed so that an input optical signal is branched at a branching ratio of 1:4. The optical signal branched at a power ratio of 4/5 is output to the first wavelength-selective switch 31, while the optical signal branched at a power ratio of 1/5 is output to the second wavelength-selective switch 32.

Each of the first and second wavelength-selective switches 31, 32 is controlled by the WSS control circuit 6 and functions as a wavelength-selective device for selecting wavelengths of the branched signal that are to be output to the output optical combiner 4. In the first embodiment, optical powers can be equalized within a predetermined variable range. FIGS. 2A and 2B are schematic diagrams showing a construction example of the first wavelength-selective switch 31. FIG. 2A is a side view schematically showing the first wavelength-selective switch 31, while FIG. 2B is a plan view schematically showing the first wavelength-selective switch 31.

As shown in FIGS. 2A and 2B, the first wavelength-selective switch 31 includes an input fiber (input port) 307, an input collimating lens 301 for making the light from the input fiber 307 parallel, a first beam expander 302, a second beam expander 303, a diffraction grating 304, a condenser lens 305, micro-electro mechanical system (MEMS) mirrors 306, output collimating lenses 321 to 32N, and output fibers (output ports) 311 to 31N.

As shown in FIG. 2A, the number of MEMS mirrors 306 corresponds to the number of wavelengths separated in the diffraction grating 304. As shown in FIG. 2B, the angles of reflection of the separated wavelengths are controlled by rotating the MEMS mirrors 306, and paths of reflected light beams can be set so that a reflected light beam at each MEMS mirror 306 is directed to any of the N output fibers (N output ports) 311 to 31N.

That is, by controlling the angle of reflection of each MEMS mirror 306 of the first wavelength-selective switch 31 in the WSS control circuit 6, wavelengths to be directed to the N output fibers 311 to 31N can be selected and controlled. In addition, by controlling the reflection angle of each mirror 306, the percentage of reflected light to be combined to the output fibers 311 to 31N can be controlled. In this manner, it becomes possible to variably attenuate the light that is output from the output ports.

In the second wavelength-selective switch 32, the input fiber 307 that is the input port of the aforementioned first wavelength-selective switch 31 is constructed as an output fiber (output port) of the second wavelength-selective switch 32, and the output fibers 311 to 31N that are the output ports of the first wavelength-selective switch 31 are constructed as input fibers of the second wavelength-selective switch 32. Therefore, the second wavelength-selective switch 32 likewise has the functions of selecting and variably attenuating an output wavelength, based on a control signal from the WSS control circuit 6.

Thus, the first wavelength-selective switch 31 has a single input port and N output ports, and one of the N output ports is connected to the output combiner 4. That is, the one output port is constructed as a through port for transmitting and outputting an optical signal through the output combiner 4, and the remaining output ports are set as drop ports for outputting the optical signal branched in the input combiner 2. And for an input wavelength-division multiplexed signal, the output ports of the first wavelength-selective switch 31 can be selected in wavelength units, so wavelengths to be output to the output combiner 4 can be freely selected and wavelengths to be dropped can be freely selected.

The second wavelength-selective switch 32 has N input ports and a single output port. The other optical signal branched in the input combiner 2 is input through one of the N input ports, and wavelengths to be added are input through the remaining input ports. The wavelength-division multiplexed signal is output to the output combiner 4 through the single output port.

Figure 3:
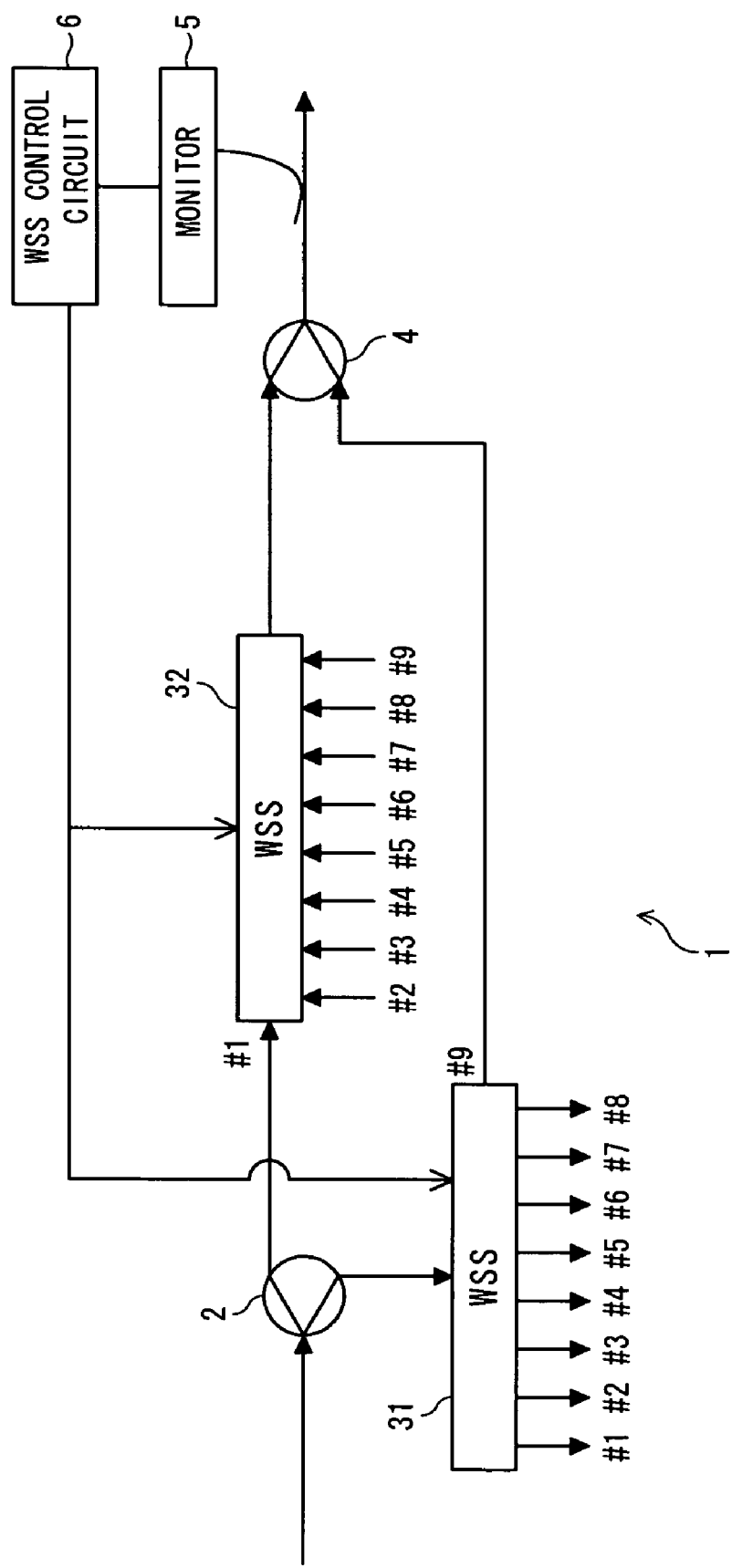
FIG. 3 is a block diagram showing the WDM transmitter of the first embodiment.

For example, as shown in FIG. 3, in the case where the first wavelength-selective switch has one input port and nine output ports and the second wavelength-selective switch 32 has nine input ports and one output port, eight output ports #1 to #8 can be set as drop ports and one output port #9 can be connected to the output combiner 4 so that a signal can pass through. Likewise, in the second wavelength-selective switch 32, one input port #1 can be set as an input port through which one of the two signals branched in the input combiner 2 is input, and the remaining eight input ports #2 to #9 can be set as add ports.

Therefore, in the case where devices of the same specification with a single port and nine ports are used as the wavelength-selective switches 31, 32 in a way that input and output ports are reversed, the first wavelength-selective switch 31 has eight ports that can be used as drop ports and the second wavelength-selective switch 32 has eight ports that can be used as add ports. Since the number of add ports and the number of drop ports can be made the same, add and drop ports can be made to correspond to each other in the proportion of 1:1.

Figure 10:
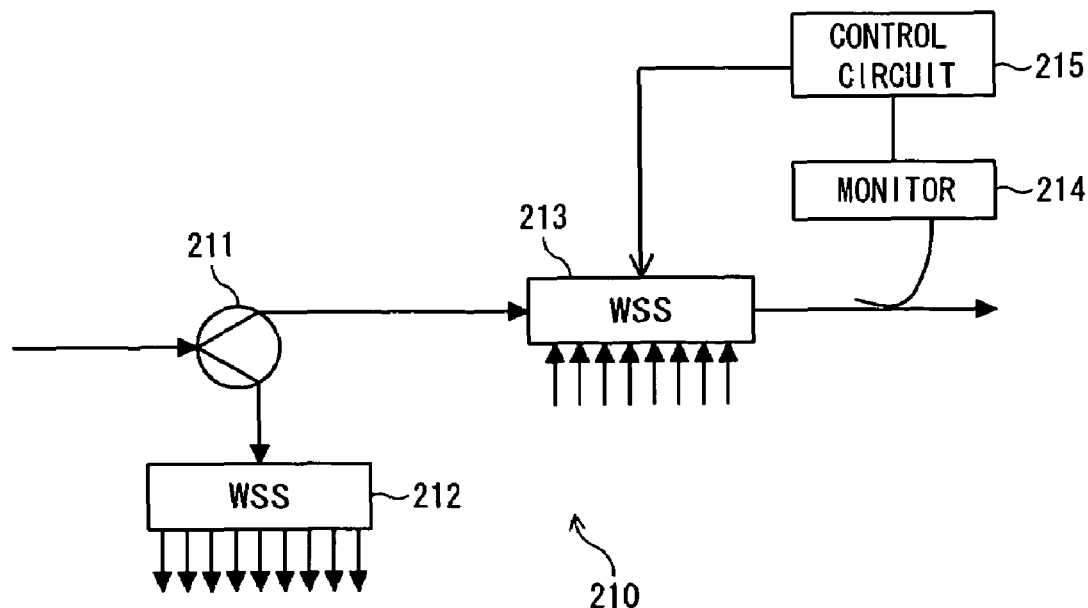
Figure 11:
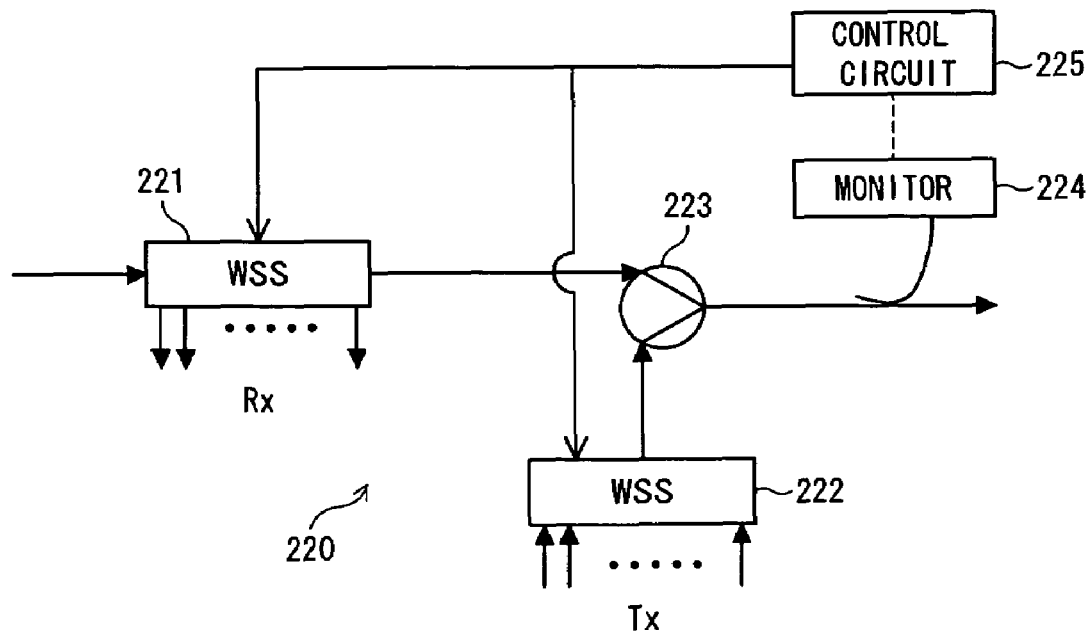
Figure 12:
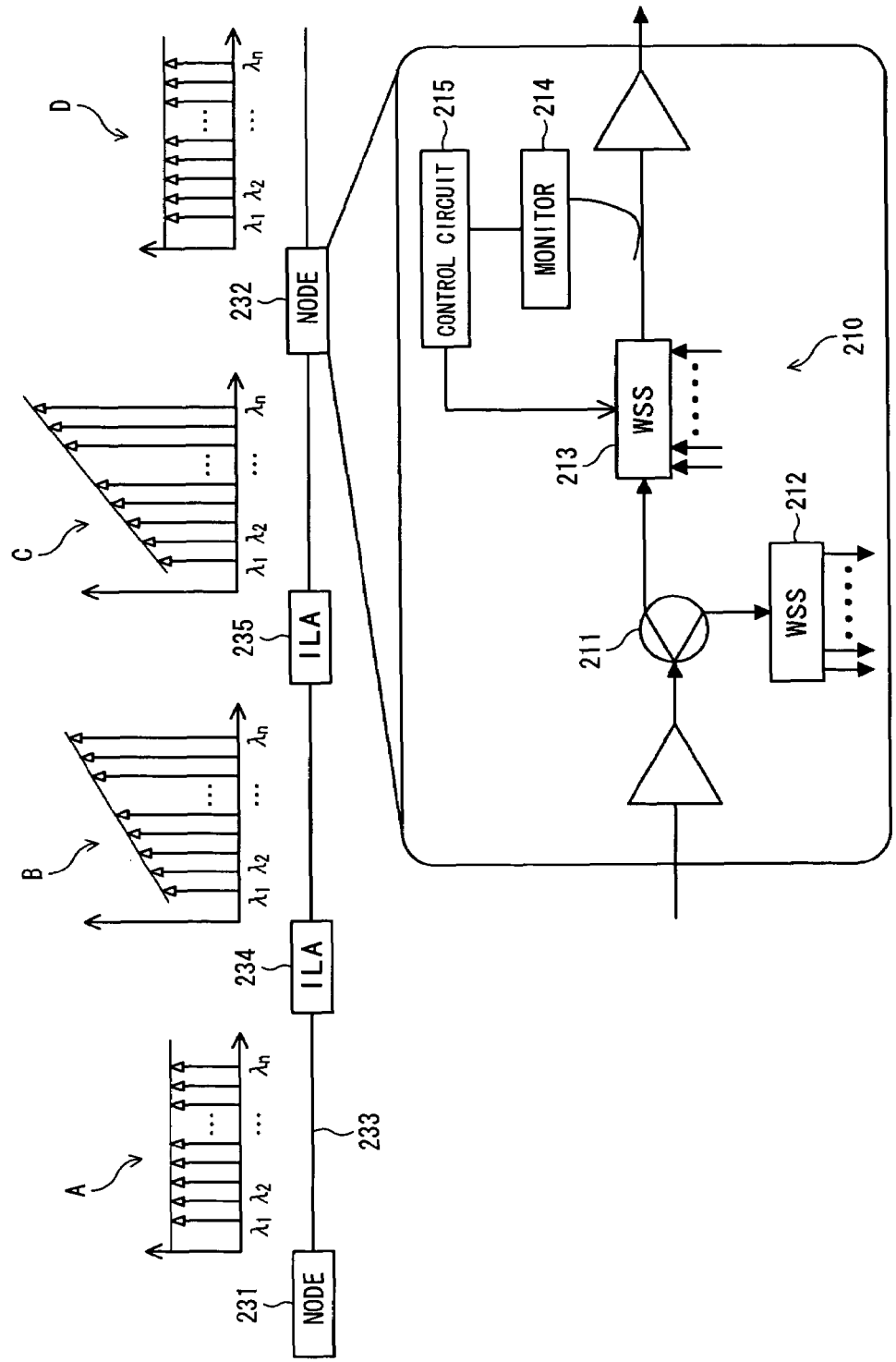
FIG. 12 is a block diagram used to explain how a conventional transmission system is operated.

On the other hand, in the WDM transmitter shown in FIG. 10, the first wavelength-selective switch 212 has N ports that can be used as drop ports and the second wavelength-selective switch 213 has N−1 ports that can be used as add ports. Thus, if add and drop ports are caused to correspond to each other in the proportion of 1:1, one drop port will remain in the first wavelength-selective switch 212.

The output combiner 4 in the WDM transmitter 1 shown in FIG. 1 is constructed as a device for coupling the optical signals respectively output from the wavelength-selective switches 31, 32. In the first embodiment, the optical signals from the wavelength-selective switches 31, 32 are combined in a coupling ratio of 1:1, and the combined signal is output to an adjacent WDM transmitter forming part of a WDM transmission system.

Note that the wavelength selection in each of the wavelength-selective switches 31, 32 is controlled so that a wavelength passed through the first wavelength-selective switch 31 does not overlap a wavelength output from the second wavelength-selective switch 32. That is, the output combiner 4 is constructed to output a wavelength-division multiplexed signal by coupling the wavelengths output from the wavelength-selective switches 31, 32 which do not overlap each other.

The monitor 5 is a power monitor for monitoring the optical power of each wavelength of the wavelength-division multiplexed signal output from the output combiner 4. This power monitor 5 can employ an optical channel monitor (JDS Uniphase), an optical monitor (AXSUN), etc.

The WSS control circuit 6 controls the wavelength selection in the wavelength-selective switches 31, 32, based on the optical power monitored at each wavelength by the monitor 5, and equalizes optical powers across the wavelengths of an optical signal output from the output combiner 4 by controlling the variable attenuator function of each of the wavelength-selective switches 31, 32.

In other words, the WSS control circuit 6 functions as a wavelength-selective device control part for controlling the optical power equalization and wavelength selection in the wavelength-selective switches 31, 32 so that optical powers are equalized across the wavelengths of an optical signal from the output combiner 4, based on the results obtained in the monitor 5. In this WSS control circuit 6, the wavelength-selective switches 31, 32 are controlled to select wavelengths that should be output to the output combiner 4, based on the optical power judged at each wavelength by the monitor 5 which is a power judging part.

At this time, for a wavelength selected so that it is output from the first wavelength-selective switch 31 to the output combiner 4, the optical power input to the first wavelength-selective switch 31 is 4/5 of the input light. For a wavelength to be output from the second wavelength-selective switch 32 to the output combiner 4, the optical power input to the second wavelength-selective switch 32 is 1/5 of the input light. Thus, there is a difference between the optical power input to the first wavelength-selective switch 31 and the optical power input to the second wavelength-selective switch 32.

Figure 13:
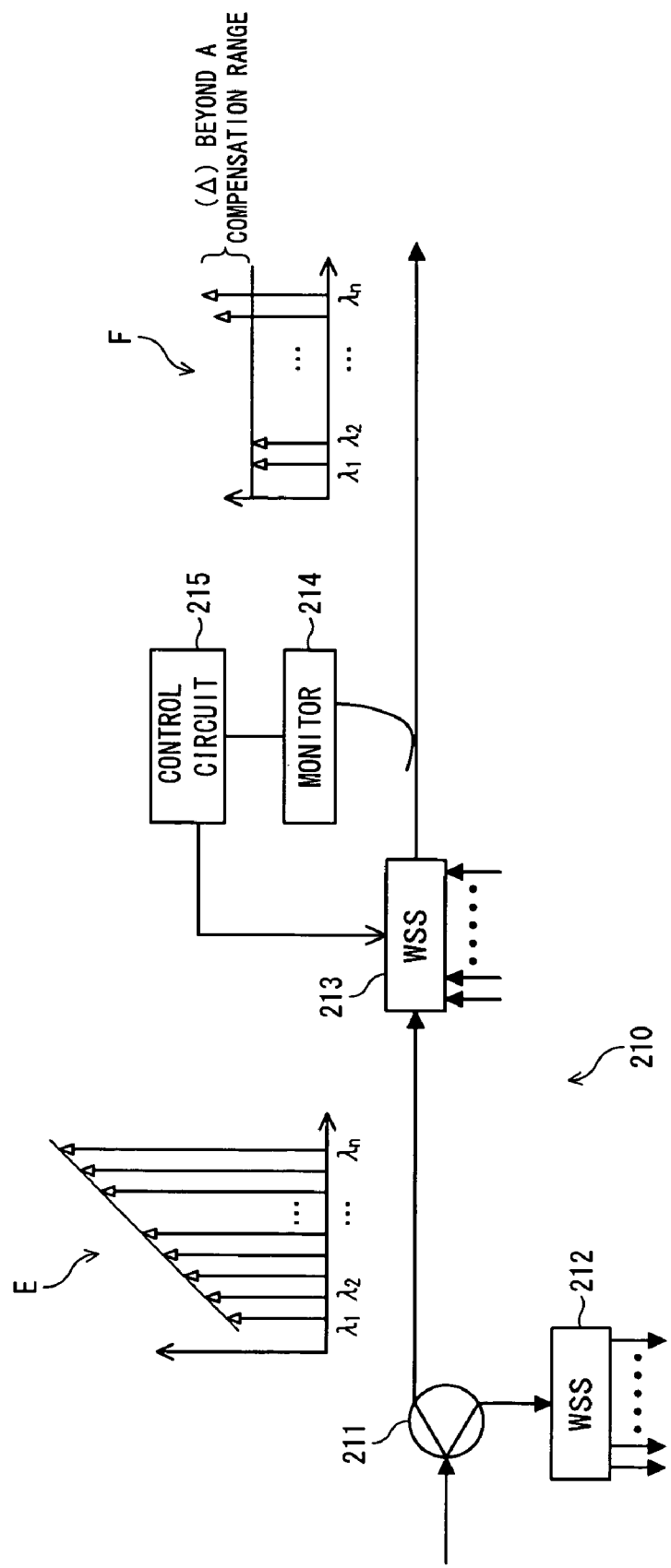
FIG. 13 is a block diagram used to explain disadvantages found in a conventional WDM transmitter.

Therefore, in the case where some of the wavelengths input to the first wavelength-selective switch 31 cannot be attenuated to a target value even if they are attenuated in the maximum attenuation range (see Δ in FIG. 13), those wavelengths can be output by being variably attenuated in the second wavelength-selective switch 32 where the input level becomes low. That is, if variable attenuation is performed in the second wavelength-selective switch 32 where the input level becomes lower than the input level to the first wavelength-selective switch 31, those wavelengths that cannot be attenuated to a target value in the first wavelength-selective switch 31 will be within a variable attenuation range. Thus, the variable attenuation range can be enlarged.

More specifically, according to a control signal from the WSS control circuit 6, at the start of the WDM transmitter 1, in the case where wavelengths to be passed through are all output from the first wavelength-selective switch 31 where the branched power is great, when an attenuation quantity for some of those wavelengths by variable attenuator control exceeds a controllable attenuation range the wavelengths are output from the second wavelength-selective switch 32 where the branched power is small.

That is, for wavelengths to be selected in the wavelength-selective switches 31, 32, the WSS control circuit 6 controls the wavelength-selective switches 31, 32 so that as the optical powers of those wavelengths judged by the monitor 5 (power judging part) become greater, those wavelengths are selected in the second wavelength-selective switch 32 provided in a line that is connected to a side where one branched power in the optical branching part 2 becomes smaller than the other branched power. This makes it possible to compensate for a difference in light intensity that cannot be equalized in prior art.

Note that in the second wavelength-selective switch 32, wavelengths dropped in the first wavelength-selective switch 31 are blocked so that they are not output to the output combiner 4, and wavelengths from the add ports are output to the output combiner 4.

The WDM transmitter 1, constructed as described above, performs a dynamic optical add-drop multiplexing process on a wavelength-division multiplexed optical signal that is input thereto. However, there are cases where a wavelength-division multiplexed optical signal input to the WDM transmitter 1 has a difference in intensity between wavelengths due to losses in transmission lines (optical fibers). The WDM transmitter 1 of the first embodiment is capable of compensating for such a difference in intensity between wavelengths in a wider range than prior art.

That is, if a wavelength-division multiplexed signal is input, the input combiner 2 branches the optical signal in a power ratio of 1:4. The branched signal with a power of 4/5 of the input optical signal is output to the first wavelength-selective switch 31, while the branched signal with a power of 1/5 of the input optical signal is output to the second wavelength-selective switch 32. That is, by unequally dividing a wavelength-division multiplexed signal input to the WDM transmitter 1, a difference in intensity is caused to occur between the signal input to the first wavelength-selective switch 31 and the signal input to the second wavelength-selective switch 32.

Figure 4:
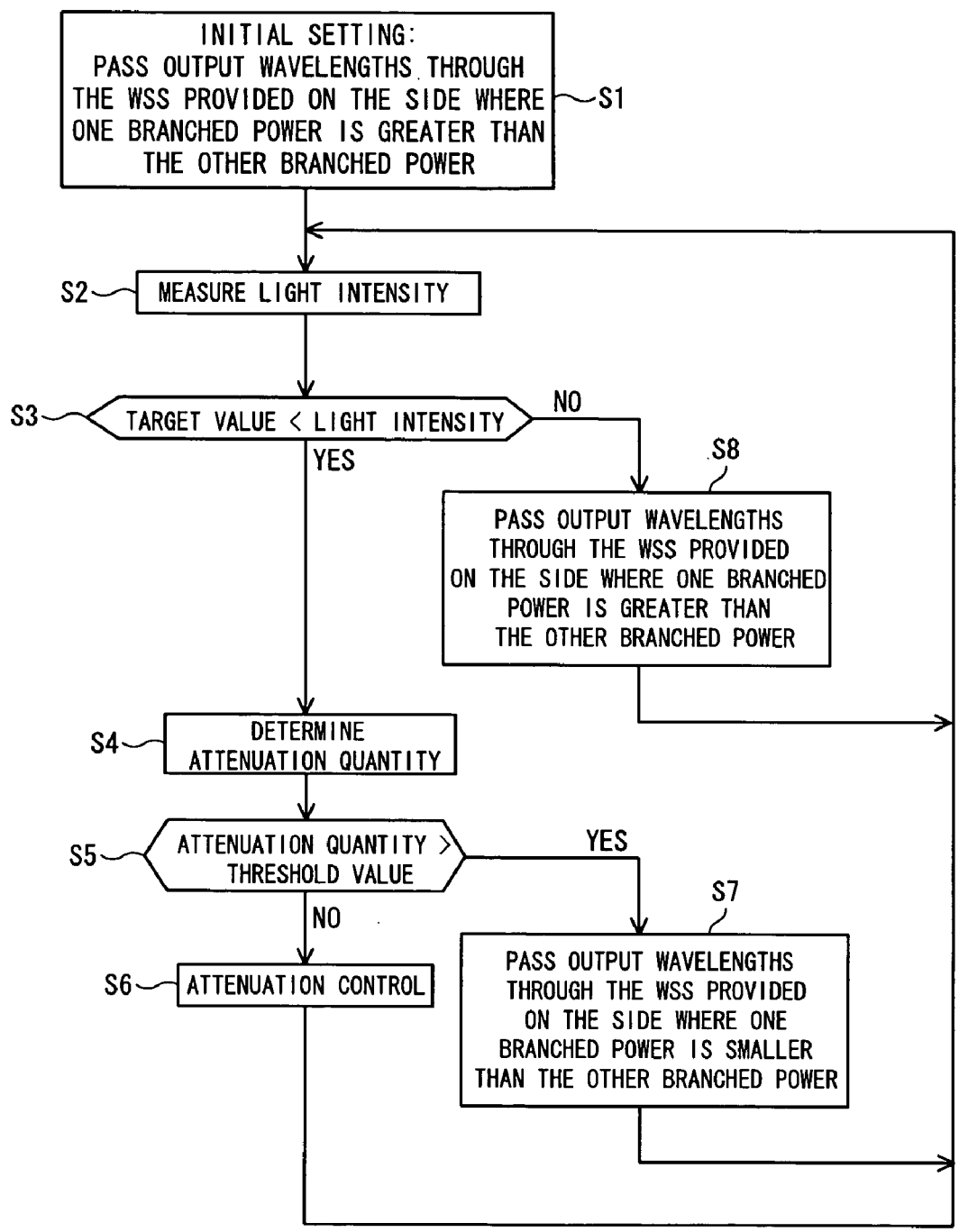
FIG. 4 is a flowchart used to explain operation of the WDM transmitter of the first embodiment.

And the WSS control circuit 6 controls the first and second wavelength-selective switches 31, 32 so that the output levels (optical powers) of the output wavelengths are equalized, based on the results (optical powers) monitored in the monitor 5, as shown in FIG. 4.

In the wavelength-selective switches 31, 32, among wavelengths input through the input combiner 2, wavelengths to be output from the respective output ports leading to the output combiner 4 are assigned by initial setting, along with wavelengths that are dropped and added.

In this case, the WSS control circuit 6 controls the first wavelength-selective switch 31 so that among wavelengths input through the input combiner 2, wavelengths (passing wavelengths) to be output from the output combiner 4 are output through the first wavelength-selective switch 31 that receives a branched signal where the branched power (4/5 of input light) in the input combiner 2 is greater than the other branched power (1/5 of input light). The WSS control circuit 6 also controls the second wavelength-selective switch 32 so that the passing wavelengths passed through the first wavelength-selective switch 31 are blocked (step S1).

According to the connection line of the input signal selected by initial setting, the WDM transmitter 1 is operated as a dynamic optical add-drop multiplexer. That is, the monitor 5 measures an optical power output through the output combiner 4 at each wavelength (step S2) and compares the measured optical power with a previously set target value (step S3).

For the wavelength at which the measured optical power is greater than the previously set target value ("YES" route in step S3), the WSS control circuit 6 determines as an attenuation quantity the difference between the target value and the optical power measured at that wavelength (step S4). When the determined attenuation quantity is less than the previously set threshold value, that wavelength is attenuated to the target value by controlling the wavelength-selective switch (at the time of the initial setting, the first wavelength-selective switch 31) selected as a wavelength-selective switch through which wavelengths are passed ("NO" route in step S5 to step S6).

On the other hand, when the determined attenuation quantity is greater than the previously set threshold value, it is judged that the determined value has exceeded the upper limit of the attenuation quantity of the wavelength-selective switch (at the time of the initial setting, the first wavelength-selective switch 31) selected as a wavelength-selective switch through which wavelengths are passed. In this case, the WSS control switch 6 switches the selected wavelength-selective switch to the second wavelength-selective switch 32 where the branched power (1/5 of input light) is small ("YES" route in step S5 to step S7). That is, the wavelength that is to be output from the second wavelength-selective switch 32 to the output combiner 4 is blocked in the first wavelength-selective switch 31 so that it is not output from the first wavelength-selective switch 31 to the output combiner 4.

When the selection of a wavelength-selective switch for outputting wavelengths is switched from the first wavelength-selective switch 31 to the second wavelength-selective switch 32, the WSS control circuit 6 receives from the monitor 5 a light intensity monitored with the attenuation quantity reduced to a minimum in the second wavelength-selective switch 32. Then, the WSS control circuit 6 determines an attenuation quantity, based on the monitored light intensity, and attenuates that wavelength with the determined attenuation quantity (steps S2 to S6). That is, even when an attenuation quantity in the wavelength-selective switch 32 is reduced to a minimum, the level of the target value can be reduced to less than the attenuation range of the second wavelength-selective switch 32, because the optical power input from the input combiner 2 to the second wavelength-selective switch 32 is 1/4 of the optical power input to the first wavelength-selective switch 31.

When a transmission line leading to the second wavelength-selective switch 32 where the branched power (1/5 of input light) is small is selected as a transmission line through which wavelengths are passed, when the light intensity measured in the monitor 5 becomes less than the target value for equalization the WSS control circuit 6 switches the selected second wavelength-selective switch 32 to the first wavelength-selective switch 31 where the branched power (4/5 of input light) is great ("No" route in step S3 to step S8), and controls wavelength attenuation (steps S2 to S6).

Next, the attenuation performance of an optical power at each wavelength by the WDM transmitter 1 of the first embodiment will be described with numerical values.

Since the input combiner 2 employs a branching ratio of 1:4, a signal smaller in light intensity than the input signal by about 7 dB is output onto a second branched line with a branched power of 1/5 of the input light (transmission line passing through the second wavelength-selective switch 32), while a signal smaller in light intensity than the input signal by about 1 dB is output onto a first branched line with a branched power of 4/5 of the input light (transmission line passing through the first wavelength-selective switch 31). Therefore, by selecting transmission lines through which wavelengths are passed, it is possible to take a light-intensity difference of about 6 dB.

Figure 5:
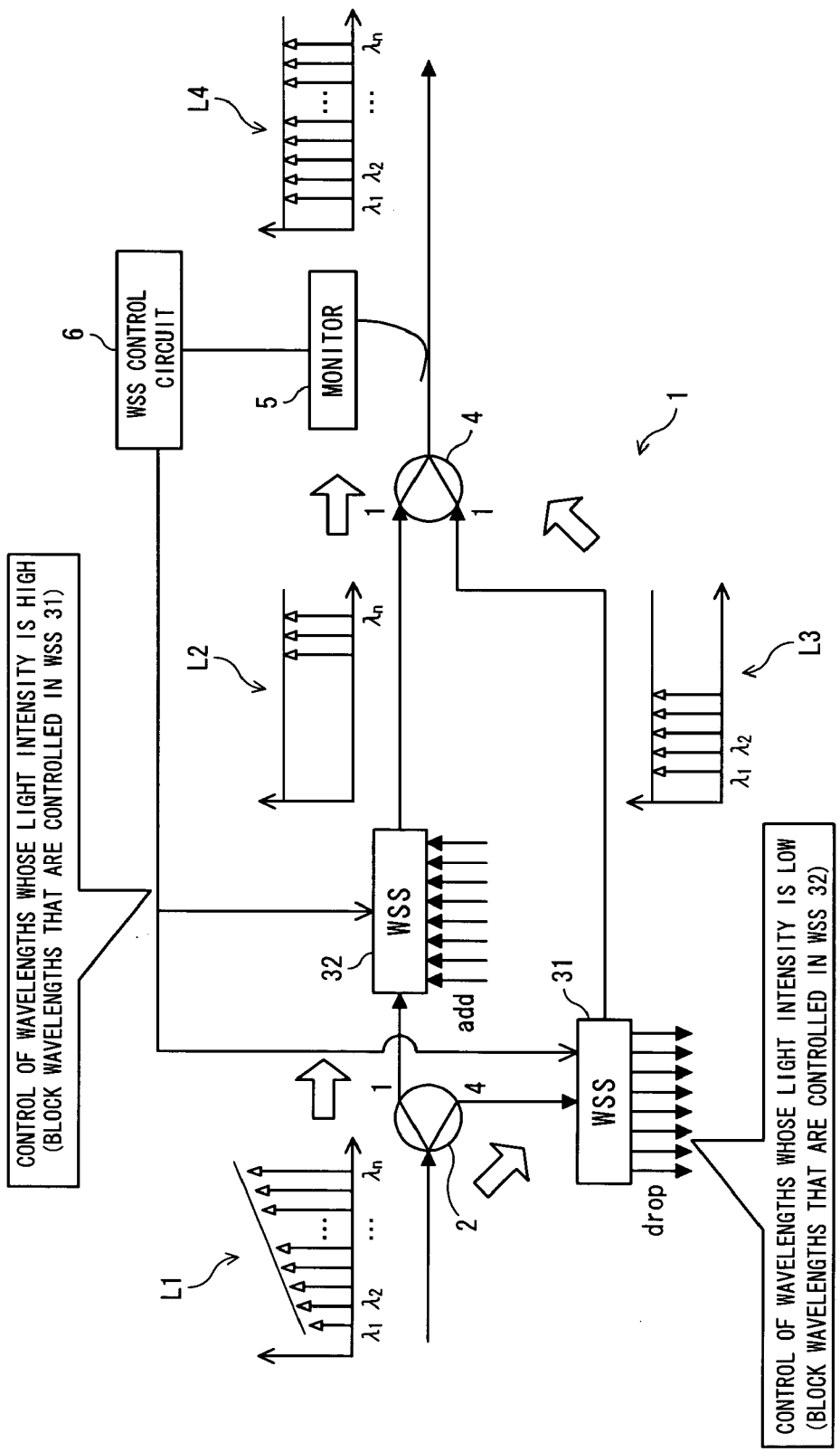
FIGS. 5 and 6 are block diagrams showing how the WDM transmitter of the first embodiment is operated.

For instance, as shown in FIG. 5, consider the case where a wavelength-division multiplexed signal L1 with a light intensity difference of (2±10) dBm/ch between wavelengths λ 1 and λ n is input. When a transmission loss in each of the wavelength-selective switches 31, 32 is 5 dB, a quantity that can be variably attenuated in the wavelength-selective switches 31, 32 is about 20 dB, and a light intensity for equalization is −20 dBm/ch, the light intensity passed through the input combiner 2 is divided into −15 to 5 dBm and −9 to 11 dBm. That is, −15 to 5 dBm is input to the second branched line having a branched power of 1/5 of the input light, while −9 to 11 dBm is input to the first branched line having a branched power of 4/5 of the input light.

When an attenuation control quantity in the wavelength-selective switches 31, 32 is 0 dB (only losses caused by passing through the wavelength-selective switches 31, 32), light intensities are respectively reduced by 5 dB after the wavelength-selective switches 31, 32. That is, the light intensity in the second branched line having a branched power of 1/5 of the input light becomes −20 to 0 dBm, while the light intensity in the first branched line having a branched power of 4/5 of the input light becomes −14 to 6 dBm. Since the coupling ratio of the output combiner 4 disposed after the wavelength-selective switches 31, 32 is 1:1, the respective branched lines have a loss of 3 dB and the intensity from the second branched line having a branched power of 1/5 of the input light and the intensity from the first branched line having a branched power of 4/5 of the input light are −23 to −3 dBm and −17 to 3 dBm at the stage of the output combiner 4.

Because a target equalization level for an optical signal output from the output combiner 4 is −20 dBm, the light intensity of the optical signal passed through the wavelength-selective switch 31 or 32 must be attenuated. If all wavelengths are transmitted onto the second branched line having a branched power of 1/5 of the input light, an optical signal of −23 dBm appears even when the attenuation quantity is zero. In this case, the optical signal whose intensity is smaller than the target equalization level −20 dBm cannot be attenuated to the target equalization level −20 dBm by the variable attenuator function. On the other hand, when all wavelengths are transmitted onto the first branched line having a branched power of 4/5 of the input light, a signal with a maximum of 3 dBm is input to the first wavelength-selective switch 31. In this case, even if the quantity that can be variably attenuated in the wavelength-selective switches 31, 32 is set to a maximum of 20 dB, the signal cannot be attenuated to the target equalization level −20 dBm.

Hence, all wavelengths are first transmitted onto the first branched line having a branched power of 4/5 of the input light, and −18 dB is set as a threshold value to a variable attenuation quantity (see step S5 in FIG. 4). A wavelength whose attenuation quantity is greater than the threshold value is blocked in the first wavelength-selective switch 31 and is passed through the second wavelength-selective switch 32 whose light intensity is small. In the second wavelength-selective switch 32, an attenuation quantity is determined from the results (optical powers) monitored by the monitor 5 so that an input intensity to an amplifier becomes −20 dBm (see step S4 in FIG. 4), and attenuation control is performed.

More specifically, when an optical signal is transmitted onto the first branched line having a branched power of 4/5 of the input light, a distribution of optical powers at the wavelengths becomes −17 to 3 dBm when an attenuation quantity in the first wavelength-selective switch 31 is 0 dB. Therefore, a wavelength whose light intensity is in a range of −17 to −2 dBm can be attenuated in the first wavelength-selective switch 31 to the target value within the maximum attenuation quantity −18 dB (see "L3" in FIG. 5), but a wavelength whose light intensity is in a range of −2 to 3 dBm cannot be equalized in the first wavelength-selective switch 31 to the target value.

Hence, a wavelength whose light intensity cannot be equalized in the first wavelength-selective switch 31 to the target value is equalized to the target value by being attenuated in the second wavelength-selective switch 32 provided in the second branched line having a branched power of 1/5 of the input light.

That is, when a wavelength, whose optical power is in a range of −2 to 3 dBm when an attenuation quantity in the first wavelength-selective switch 31 provided in the first branched line having a branched power of 4/5 of the input light is 0 dB, is transmitted onto the second branched line having a branched power of 1/5 of the input light, an optical power distribution of −8 to −3 dBm is obtained if an attenuation quantity in the second wavelength-selective switch 32 is 0 dB. Therefore, in the second wavelength-selective switch 32, a wavelength whose optical power cannot be equalized in the first wavelength-selective switch 31 to the target value can be equalized to the target value −20 dBm even when a threshold value for a variable attenuation quantity is set to −18 dBm (see "L2" in FIG. 5).

Thus, the optical signal L3 passed through the first wavelength-selective switch 31 and the optical signal L2 passed through the second wavelength-selective switch 32 are combined in the output combiner 4, whereby an optical signal L4 equalized to the target level can be obtained.

Figure 6:
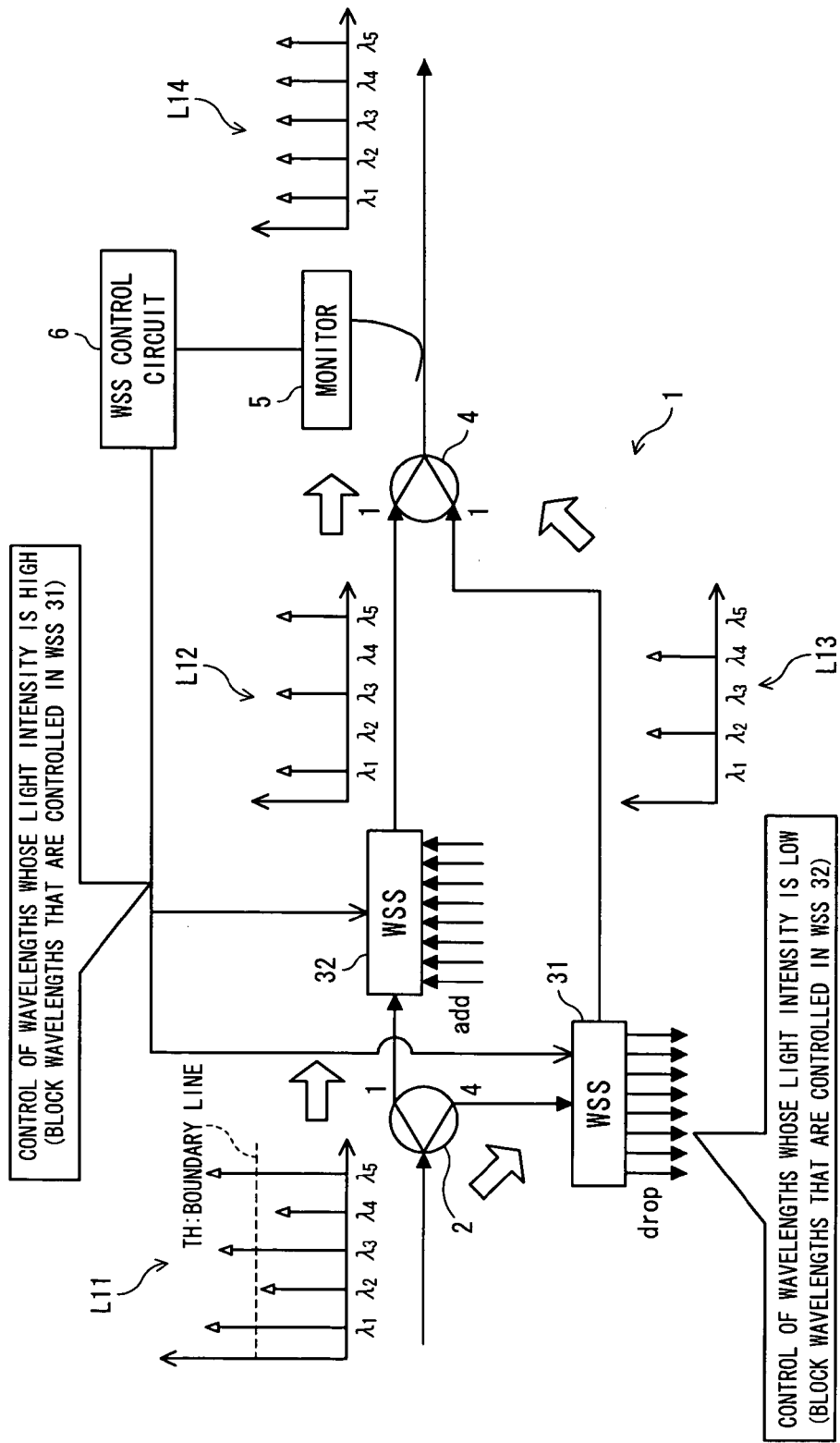

In addition, as shown in FIG. 6, even in the case where a difference in intensity cannot be correlated with the arrangement of wavelengths, light intensities can be made optimum between different wavelengths. For example, consider the case where a wavelength-division multiplexed signal L11 with wavelengths λ 1 to λ 5 is input. In this case, an attenuation quantity calculated to obtain a target light intensity in the first wavelength-selective switch 31 from the intensities of wavelengths λ 1 to λ 3 is greater than the aforementioned threshold value, and an attenuation quantity obtained from the intensities of wavelengths λ 2 and λ 4 is smaller than the threshold value. Note that the reference character TH in FIG. 6 denotes a boundary line at which an attenuation quantity calculated in attenuating in the first wavelength-selective switch becomes greater than the threshold value. A wavelength whose light intensity is less than this boundary line TH can be attenuated in the first wavelength-selective switch 31 to the target value level, while a wavelength whose light intensity is greater than the boundary line TH cannot be attenuated in the first wavelength-selective switch 31 to the target value level.

In this case, if a compensation for light intensity is made by transmitting the optical signal L12 with wavelengths λ 1, λ 3, and λ 5 onto a transmission line whose loss is great (transmission line having a branched power of 1/5 of the input light and passing through the second wavelength-selective switch 32) and transmitting the optical signal L13 with wavelengths λ 2 and λ 4 onto a transmission line whose loss is small (transmission line having a branched power of 4/5 of the input light and passing through the first wavelength-selective switch 31), the optical signal L14 equalized to the target level can be obtained from the output combiner 4.

Thus, the WDM transmitter 1 according to the first embodiment of the present invention is constructed so that input wavelengths are divided in the input combiner 2 at a power ratio M:N where M and N differ from each other. Therefore, if the wavelength selection in each of the wavelength-selective switches 31, 32 is controlled so that a wavelength whose power is relatively great is selected in the second wavelength-selective switch 32 provided in the second branched line where the branched power is small and so that a wavelength whose power is relatively small is selected in the first wavelength-selective switch 31 provided in the first branched line where the branched power is great, a range that can compensate for a difference in intensity between wavelengths can be enlarged. Thus, the WDM transmitter 1 has the advantage of being able to enhance its ability to compensate for a difference in intensity.

The WDM transmitter 1 also has the advantage of being able to enhance its ability to accurately compensate for a difference in intensity in a relatively wide range exceeding a range which can be compensated by only the variable attenuator function of each of the wavelength-selective switches 31, 32, by feeding back the light intensity of each output wavelength by the variable attenuator functions of the wavelength-selective switches 31, 32.

In the aforementioned first embodiment, the variable attenuator functions of the wavelength-selective switches 31, 32 are controlled so that an optical signal from the output combiner 4 becomes uniform in wavelength. However, even if the variable attenuation operation is not performed in the wavelength-selective switches 31, 32, equalization of output wavelengths can be easily performed by only the operation of selecting wavelengths in the wavelength-selective switches 31, 32, because input wavelengths are divided in the input combiner 2 at a power ratio M:N where M and N differ from each other.

That is, if wavelength selection in each of the wavelength-selective switches 31, 32 is controlled so that wavelengths whose power is relatively great are selected in the second wavelength-selective switch 32 where the branched power is small and so that wavelengths whose power is relatively small are selected in the first wavelength-selective switch 31 where the branched power is great, the optical powers at the output wavelengths can be easily equalized without using the variable attenuator functions of the wavelength-selective switches 31, 32.

In the aforementioned first embodiment, input light is divided at an unequal branching ratio of 1:4 by the input combiner 2, and branched optical signals are combined at an equal coupling ratio of 1:1 by the output combiner 4. However, the present invention is not limited to this embodiment. For example, the branching ratio in the input combiner 2 may be an equal branching ratio, while the coupling ratio in the output combiner 4 may be an unequal coupling ratio. The branching ratio in the input combiner 2 and the coupling ratio in the output combiner 4 may also be combined to obtain an unequal ratio other than 1:1.

In the aforementioned first embodiment, the variable attenuator function of each of the wavelength-selective switches 31, 32 is controlled so that the optical powers at the wavelengths of an output signal from the output combiner 4 are equalized. However, the present invention is not limited to this embodiment. For example, in the case where an optical amplifier is disposed after the output combiner 4, it is also possible to variably attenuate the intensity of each wavelength so that the output optical powers from the amplifier are equalized, considering the amplified wavelength characteristic of that amplifier.

In the aforementioned first embodiment, two branched lines are provided for input light, and the range of light intensities that are variably attenuated in the wavelength-selective switches 31, 32 is divided. However, the present invention may provide three or more branched lines and divide in stages a light intensity range which is variably attenuated in wavelength-selective switches provided in the three or more branched lines. In this case, each of the wavelength-selective switches is controlled so that as an optical power at a wavelength becomes greater, that wavelength is passed through the wavelength-selective switch provided in a line where one branched power in the input combiner 2 or combined power in the output combiner 4 becomes smaller than the other branched or combined powers.

The branching function of the input combiner 2 and the coupling function of the output combiner 4 are not to be limited to optical combiners, but other known optical branching devices and optical coupling devices can be employed. For example, instead of employing the optical combiners 2, 4, optical fibers and wavelength-selective switches can be employed.

(B) Description of Second Embodiment

Figure 7:
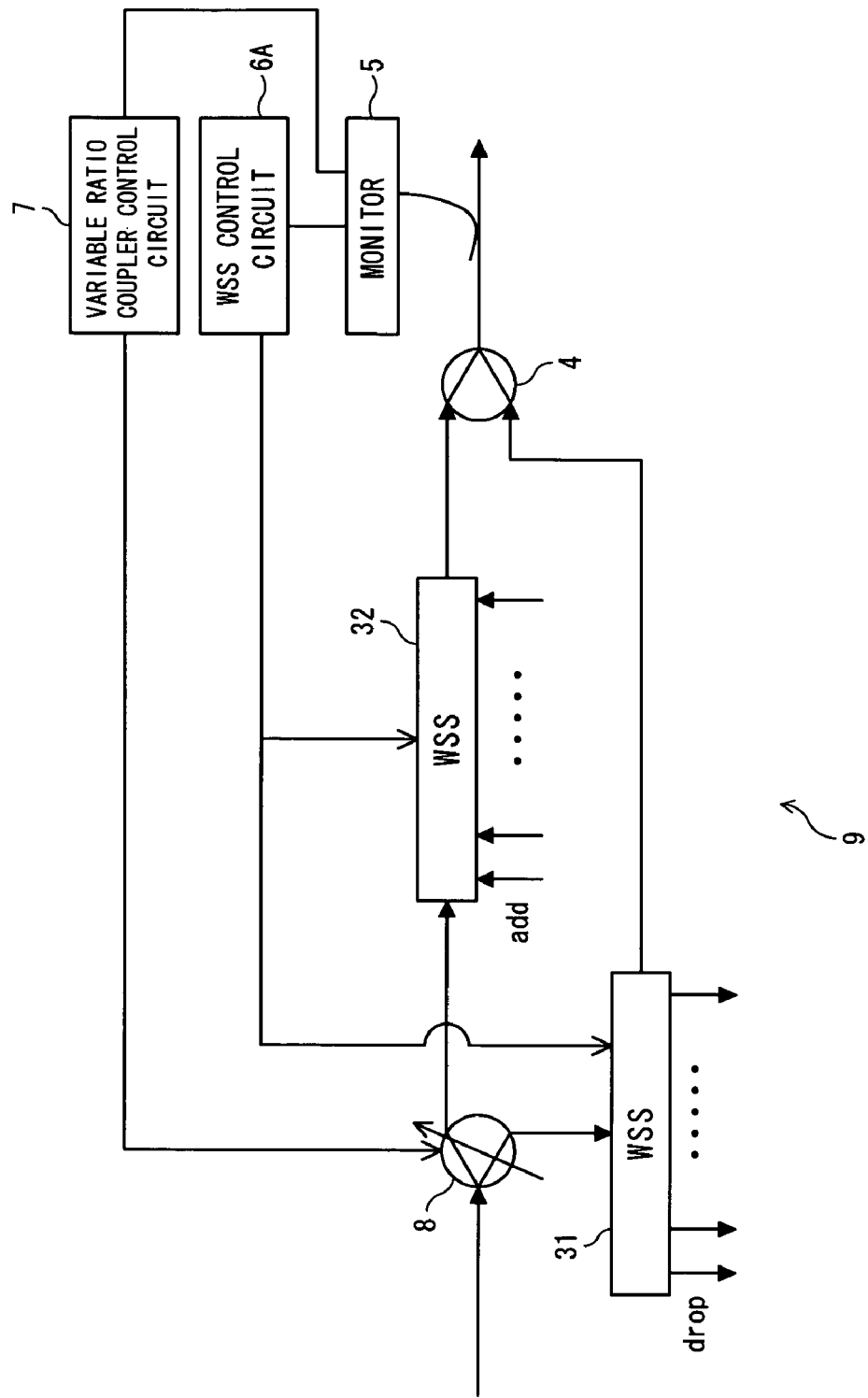
FIG. 7 is a block diagram showing a WDM transmitter constructed in accordance with a second embodiment of the present invention.
Figure 8A:
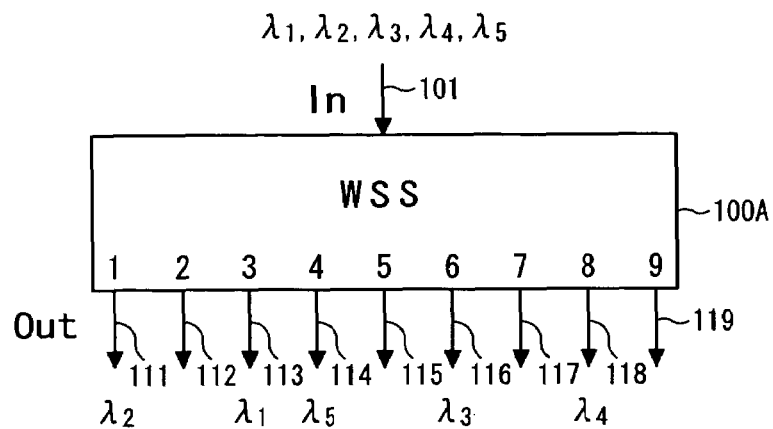
FIG. 8A is a diagram used to explain the function of a wavelength-selective switch consisting of a single input ports and nine output ports.
Figure 8B:
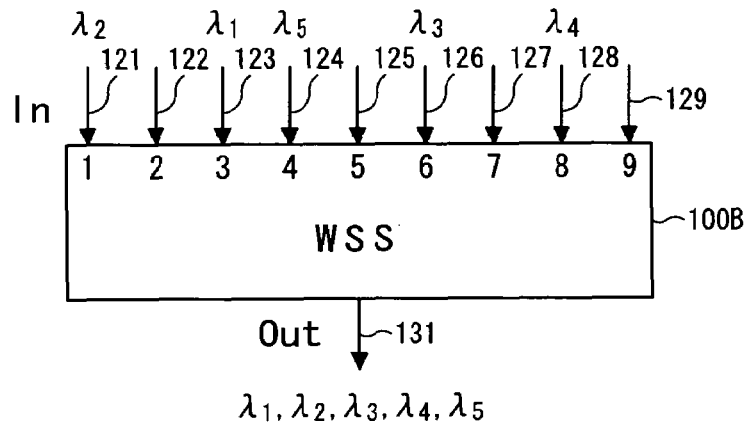
FIG. 8B is a diagram used to explain the function of a wavelength-selective switch consisting of nine input ports and a single output port.

Referring to FIG. 7, there is shown an optical transmitter, or a WDM transmitter 9 constructed in accordance with a second embodiment of the present invention. Unlike the WDM transmitter 1 of the first embodiment mentioned above, an optical branching part for branching input light into a plurality of parts (in this embodiment, two parts) comprises a variable branching-ratio combiner (variable ratio combiner) 8 that can vary a branching ratio. By making the branching ratio of the variable branching-ratio combiner 8 variable, the optical powers of a wavelength-division multiplexed signal from an output combiner 4 are made uniform across different wavelengths.

Because of this, the WDM transmitter 9 of the second embodiment includes a variable ratio combiner control circuit 7 for controlling the branching ratio of the variable branching-ratio combiner 8 and also includes a WSS control circuit 6A for controlling wavelength selection that is performed in wavelength-selective switches 31, 32. Note in FIG. 7 that the same reference numerals as FIG. 1 denote similar parts.

The WSS control circuit (wavelength-selective device control part) 6A controls the wavelength-selective switches 31, 32 so that output wavelengths to the output combiner 4 are selected in the wavelength-selective switches 31, 32, based on theoptical power of each wavelength monitored in the monitor 5. However, unlike the case of the first embodiment, the WSS control circuit (wavelength-selective device control part) 6A does not attenuate selected wavelengths by the variable attenuator function of each of the wavelength-selective switches 31, 32.

The variable ratio combiner control circuit 7 controls the variable branching-ratio combiner 8 to set the branching ratio of the variable branching-ratio combiner 8, based on the optical powers of the output wavelengths monitored in the power monitor 5. That is, the branching ratio in the variable branching-ratio combiner 8 is controlled so that the optical powers monitored in the monitor 5 are equalized across the output wavelengths.

That is, in the second embodiment, the output powers from the output combiner 4 can be made uniform across the output wavelengths, by variably controlling the branching ratio of the variable branching-ratio combiner 8 from the relationship of the wavelengths from the wavelength-selective switches 31, 32 selected and controlled in the WSS control circuit 6A. In other words, the powers at the output wavelengths can be made uniform through the cooperation of the selection control of output wavelengths in the wavelength-selective switches 31, 32 by the WSS control circuit 6A and the branching-ratio control of the variable branching-ratio combiner 8 by the variable ratio combiner control circuit 7.

In this case, in the WSS control circuit 6A, the wavelength-selective switches 31, 32 are controlled so that as the power of an output wavelength monitored in the monitor 5 becomes greater, that wavelength is selected in the wavelength-selective switch (e.g., the second wavelength-selective switch 32) provided in a line where one branched power in the variable branching-ratio combiner 8 becomes smaller than the other branched power. At this time, the WSS control circuit 6A controls the wavelength-selective switches 31, 32 so that the output wavelengths selected in the wavelength-selective switches 31, 32 do not overlap each other.

For instance, by controlling the wavelength-selective switches 31, 32 by the WSS control circuit 6A, a light intensity at each wavelength of an input wavelength-division multiplexed signal is compared with a threshold value such as the aforementioned "TH" shown in FIG. 6, and a wavelength greater than the threshold value is selected as an output wavelength in the wavelength-selective switch provided in a line which makes a branched power in the variable branching-ratio combiner 8 small. On the other hand, a wavelength smaller than the threshold value is selected as an output wavelength in the wavelength-selective switch provided in a line which a branched power in the variable branching-ratio combiner 8 great.

More specifically, consider the case where a wavelength-division multiplexed signal L11 with wavelengths λ 1 to λ 5 is input as shown in FIG. 6. In this case, the wavelengths λ 1, λ 3, and λ 5 whose light intensity is greater than the threshold value (e.g., L12 in FIG. 6) can be transmitted onto the line on the side which makes a transmission loss great, that is, makes a branched power in the variable ratio combiner control circuit 7 small (e.g., a transmission line on the side of the second wavelength-selective switch 32). On the other hand, the wavelengths λ 2 and λ 4 whose light intensity is smaller than the threshold value (e.g., L13 in FIG. 6) can be transmitted onto the line on the side which makes a transmission loss small, that is, makes a branched power in the variable ratio combiner control circuit 7 great (e.g., a transmission line on the side of the first wavelength-selective switch 31).

And the variable ratio combiner control circuit 7 controls the branching ratio of the variable branching-ratio combiner 8 so that the light intensities at the wavelengths of a wavelength-division multiplexed signal combined in the output combiner 4 become uniform, based on the light intensity at a wavelength output from the first wavelength-selective switch 31 and on the light intensity at a wavelength output from the second wavelength-selective switch 32, from the results obtained in the monitor 5.

In this case, for example, by calculating a ratio of an average value of a distribution of light intensities of the output wavelengths of the first wavelength-selective switch 31 and an average value of a distribution of light intensities of the output wavelengths of the second wavelength-selective switch 32 and then controlling the branching ratio of the variable branching-ratio combiner 8 so that it becomes the reverse of the calculated ratio, the light intensities of a wavelength-division multiplexed signal that is to be combined in the output combiner 4 can be made uniform.

With the aforementioned construction, in the WDM transmitter 9 of the second embodiment, the light intensities at the wavelengths of a wavelength-division multiplexed signal that is output from the output combiner 4 are made uniform through the cooperation of the WSS control circuit 6A and the variable ratio combiner control circuit 7.

That is, a wavelength-division multiplexed signal input to the WDM transmitter 9 is branched into two signals in the variable branching-ratio combiner 8. One of the two signals is output to the first wavelength-selective switch 31, while the other signal is output to the second wavelength-selective switch 32. In response to a control signal from the WSS control circuit 6A, each of the wavelength-selective switches 31, 32 selects output wavelengths and outputs them to the output combiner 4. The monitor 5 calculates a distribution of the light intensities of the wavelengths of a wavelength-division multiplexed signal output from the output combiner 4.

In this case, at the time of initial setting, the branching ratio of the variable branching-ratio combiner 8 is set to a ratio of 1:1 by the variable ratio combiner control circuit 7. The WSS control circuit 6A controls the wavelength selection of the wavelength-selective switches 31, 32, based on the results obtained by the monitor 5. That is, a wavelength greater than the threshold value is selected as an output wavelength in the wavelength-selective switch provided in a line that makes a branched power in the variable branching-ratio combiner 8 small, while a wavelength smaller than the threshold value is selected as an output wavelength in the wavelength-selective switch provided in a line that makes a branched power in the variable branching-ratio combiner 8 great. Note that the wavelength-selective switches 31, 32 do not perform variable attenuation control of output wavelengths.

If the aforementioned wavelength selection is performed in the wavelength-selective switches 31, 32, the variable ratio combiner control circuit 7 controls the branching ratio of the variable branching-ratio combiner 8 so that the light intensities of the wavelengths of a wavelength-division multiplexed signal from the output combiner 4 become uniform, based on the light intensities of the wavelengths output from the first wavelength-selective switch 31 and on the light intensities of the wavelengths output from the second wavelength-selective switch 32.

Thus, the WDM transmitter 9 of the second embodiment of the present invention includes the variable branching-ratio combiner 8 and variable ratio combiner control circuit 7. The WSS control circuit 6A performs the selection of wavelengths that are to be output from the wavelength-selective switches 31, 32. In addition, the variable ratio combiner control circuit 7 variably controls the branching ratio of the variable branching-ratio combiner 8 so that the light intensities of the wavelengths of a wavelength-division multiplexed signal output from the output combiner 4 become uniform. Therefore, by a control method which is simpler than the control using the variable attenuator functions of the wavelength-selective switches 31, 32, that is, by variably controlling the branching ratio of the variable branching-ratio combiner 8 while simplifying control of the wavelength-selective switches 31, 32, the light intensities of the wavelengths of an output optical signal can be made uniform. Therefore, the second embodiment, as with the first embodiment, has the advantage of being able to enhance its ability to compensate for a difference in intensity between different wavelengths.

The aforementioned second embodiment includes two branched lines for input light and variably controls a branched power in each of the branched lines. However, the present invention may include three or more branched lines and variably control each branched power in stages.

The aforementioned second embodiment equalizes the intensities of the wavelengths of a wavelength-division multiplexed signal output from the output combiner 4, by controlling the branching ratio of the variable branching-ratio combiner 8. The present invention is not to be limited to this embodiment, but may employ a variable coupling-ratio combiner (variable ratio combiner) and control the coupling ratio of the variable coupling-ratio combiner. In this case, by a control circuit equivalent to the variable ratio combiner control circuit 7, the coupling ratio in the variable coupling-ratio combiner is controlled so that the light intensities of the wavelengths of a wavelength-division multiplexed signal become uniform, based on results monitored in the monitor 5. The present invention may also include both a variable branching-ratio combiner and a variable coupling-ratio combiner and variably control the branching ratio and coupling ratio. The same applies to the case of three or more branched lines.

(C) Other Embodiments

While the present invention has been described with reference to the preferred embodiments thereof, the invention is not to be limited to the details given herein, but may be modified within the scope of the invention hereinafter claimed.

For example, in the aforementioned first and second embodiments, the WDM transmitter is employed as a dynamic optical add-drop multiplexer. However, the present invention is also applicable to transmitters having other functions.

Now that the preferred embodiments of the present invention have been described, it will be apparent to those skilled in this art that the WDM transmitter of the present invention can be easily carried out and manufactured.

What is claimed is:

1. A wavelength-division multiplexing transmitter comprising:
   an optical branching part for branching a wavelength-division multiplexed input optical signal into a plurality of optical signals;
   a plurality of wavelength-selective devices, for selecting as output wavelength the wavelengths of each of said optical signals branched by said optical branching part, for variably attenuating said optical signals each having said selected output wavelength, and for outputting said variably attenuated optical signals; and
   an optical coupling part for coupling said variably attenuated optical signals output from said plurality of wavelength-selective devices;
   wherein said optical branching part branches the input optical signal into the plural optical signals with a different branching power ratio, and/or said optical coupling part couples said variably attenuated optical signals output from said plural wavelength-selective devices with a different branching power ratio.

2. The wavelength-division multiplexing transmitter as set forth in claim 1, wherein:
   at least either said optical branching part or said optical coupling part comprises a variable ratio combiner; and
   at least either a branching ratio in said optical branching part or a coupling ratio in said optical coupling part is made variable by said variable ratio combiner.

3. The wavelength-division multiplexing transmitter as set forth in claim 2, further comprising:
   a power monitor for monitoring an optical power at each of the wavelengths of an optical signal output from said optical coupling part; and
   a variable ratio combiner control part for controlling said variable ratio combiner to set the branching ratio or coupling ratio of said variable ratio combiner, based on said optical power monitored at each of the wavelengths of said output optical signal by said power monitor.

4. The wavelength-division multiplexing transmitter as set forth in claim 1, wherein:
   said optical branching part is constructed so that said input optical signal is branched into two parts;
   said wavelength-selective devices comprise two wavelength-selective devices so that they correspond to the number of branched parts; and
   said optical coupling part is constructed to combine two optical signals respectively output from said two wavelength-selective devices.

5. The wavelength-division multiplexing transmitter as set forth in claim 4, wherein one of said two wavelength-selective devices comprises a first wavelength-selective switch having a single input and a plurality of outputs, while the other comprises a second wavelength-selective switch having a plurality of inputs and a single output.

6. The wavelength-division multiplexing transmitter as set forth in claim 5, wherein:

the single input of said first wavelength-selective switch is connected to one of two branch outputs of said optical branching part, one of the outputs of said first wavelength-selective switch is connected to one of two inputs of said optical coupling part, and the remaining outputs of said first wavelength-selective switch are used as drop outputs; and one of the inputs of said second wavelength-selective switch is connected to the other of the two branch outputs of said optical branching part, the remaining inputs of said second wavelength-selective switch are used as add inputs, the single output of said second wavelength-selective switch is connected to the other of the two inputs of said optical coupling part.

7. A wavelength-division multiplexing transmitter comprising:

an optical branching part for branching a wavelength-division multiplexed input optical signal into a plurality of optical signals;

a plurality of wavelength-selective devices for selecting as output wavelengths the wavelengths of each of said optical signals branched by said optical branching part; and an optical coupling part for coupling said output wavelengths respectively output from said plurality of wavelength-selective devices;

wherein at least either the branching in said optical branching part or the coupling in said optical coupling part is performed at a power ratio M:N where M and N differ from each other, and the wavelength-division multiplexing transmitter further comprising:

a power monitor for monitoring an optical power at each of the wavelengths of an optical signal output from said optical coupling part; and a wavelength-selective device control part for controlling each of said wavelength-selective devices so that said output wavelengths to said optical coupling part are selected in each of said wavelength-selective devices, based on said optical power monitored at each of the wavelengths of said output optical signal by said power monitor.

8. The wavelength-division multiplexing transmitter as set forth in claim 7, wherein:

said plurality of wavelength-selective devices are constructed so that they can select said output wavelengths and vary an optical power of each of said output wavelengths; and said wavelength-selective device control part performs the variable control of the optical power and control of the wavelength selection of said plurality of wavelength-selective devices so that the optical powers at the wavelengths of said optical signal output from said optical coupling part are equalized, based on the optical powers monitored by said power monitor.

9. The wavelength-division multiplexing transmitter as set forth in claim 7, wherein said wavelength-selective device control part controls each of said wavelength-selective devices so that as an optical power monitored at a wavelength of said optical output signal by said power monitor becomes greater, said wavelength is selected in the wavelength-selective device provided in a line that is connected to a side where one branched power in said optical branching pert or one combined power in said optical coupling part becomes smaller than the other branched or combined powers.

10. The wavelength-division multiplexing transmitter as set forth in claim 7, wherein said wavelength-selective device control part controls each of said wavelength-selective devices so that said output wavelengths selected in said wavelength-selective devices do not overlap each other.

11. A wavelength-division multiplexing transmitter comprising:

an optical branching part for branching a wavelength-division multiplexed input optical signal into a plurality of optical signals; a plurality of wavelength-selective switches for selecting as output wavelengths the wavelengths of each of said optical signals branched by said optical branching part; and an optical coupling part for coupling said output wavelengths respectively output from said plurality of wavelength-selective switches;

wherein at least either the branching in said optical branching part or the coupling in said optical coupling part is performed at a power ratio M:N where M and N differ from each other, and said plurality of wavelength-selective switches have a single input and a plurality of outputs, or have a plurality of inputs and a single output.

* * * * *